(12) United States Patent
Van Der Ham (10) Patent No.: US 11,246,206 B2
(45) Date of Patent: Feb. 8, 2022

(54) ACTIVATING A LIGHT SOURCE IN DEPENDENCE ON PREVIOUS POWER CYCLE DURATION

(71) Applicant: SIGNIFY HOLDING B.V., Eindhoven (NL)

(72) Inventor: Marcel Van Der Ham, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,951

(22) PCT Filed: Aug. 29, 2019

(86) PCT No.: PCT/EP2019/073069
§ 371 (c)(1),
(2) Date: Mar. 3, 2021

(87) PCT Pub. No.: WO2020/048861
PCT Pub. Date: Mar. 12, 2020

(65) Prior Publication Data
US 2021/0329767 A1    Oct. 21, 2021

(30) Foreign Application Priority Data
Sep. 3, 2018    (EP) .................................... 18192259

(51) Int. Cl.
*H05B 47/10*    (2020.01)
*H05B 47/16*    (2020.01)

(52) U.S. Cl.
CPC ..................... *H05B 47/16* (2020.01)

(58) Field of Classification Search
CPC ........ H05B 45/10; H05B 47/10; H05B 47/14; H05B 47/16
See application file for complete search history.

(56) References Cited

U.S. PATENT DOCUMENTS

| 5,212,478 A | 5/1993 | Moseley |
| 9,226,373 B2 * | 12/2015 | King ..................... H04W 4/029 |
| 2009/0195161 A1 | 8/2009 | Lane et al. |
| 2012/0262093 A1 | 10/2012 | Recker et al. |

(Continued)

FOREIGN PATENT DOCUMENTS

| EP | 2830395 A1 | 1/2015 |
| EP | 3166194 A1 | 5/2017 |

(Continued)

OTHER PUBLICATIONS

ZigBee Control Your World, ZigBee Lighting & Occupancy Device Specification, Version 1.0, Feb. 24, 2016, pp. 1-122.

*Primary Examiner* — Jimmy T Vu
(74) *Attorney, Agent, or Firm* — Daniel J. Piotrowski (57) ABSTRACT

A method of activating at least one light source comprises reading (109) a value from a memory of a light device upon the light device being powered on. The value depends on how long the light device was continuously powered on before the light device was last powered off. The method further comprises determining (203) from the value whether the light device was continuously powered on for more than a predetermined period before the light device was last powered off and activating (213) the at least one light source in dependence on the determination.

13 Claims, 4 Drawing Sheets

(56) References Cited

U.S. PATENT DOCUMENTS

| | | |
|---|---|---|
| 2015/0130282 A1 | 5/2015 | Mishra et al. |
| 2016/0181863 A1 | 6/2016 | Suman |
| 2018/0014386 A1 | 1/2018 | Bhutani et al. |
| 2018/0052504 A1 | 2/2018 | Wendt et al. |
| 2018/0116020 A1* | 4/2018 | Beghelli .............. H05B 45/385 |

FOREIGN PATENT DOCUMENTS

| | | |
|---|---|---|
| GB | 2534910 A | 8/2016 |
| JP | H04-233197 A | 8/1992 |
| JP | 2008-041254 A | 2/2008 |
| JP | 2013-118200 A | 6/2013 |
| WO | 2008084414 A1 | 7/2008 |
| WO | 2017025278 A1 | 2/2017 |

\* cited by examiner

Fig. 5

ACTIVATING A LIGHT SOURCE IN DEPENDENCE ON PREVIOUS POWER CYCLE DURATION

CROSS-REFERENCE TO PRIOR APPLICATIONS

This application is the U.S. National Phase application under 35 U.S.C. § 371 of International Application No. PCT/EP2019/073069, filed on Aug. 29, 2019, which claims the benefit of European Patent Application No. 18192259.2, filed on Sep. 3, 2018. These applications are hereby incorporated by reference herein.

FIELD OF THE INVENTION

The invention relates to a light device.

The invention further relates to a method of activating at least one light source.

The invention also relates to a computer program product enabling a computer system to perform such a method.

BACKGROUND OF THE INVENTION

The default behavior of a typical connected light device, when it is supplied with power, is that it will start up at its default factory configured power on color (typically 2700K white light). The Zigbee Lighting & Occupancy Device Specification version 1.0 specifies a StartUpOnOff attribute that defines the desired startup behavior of a light device when it is supplied with power. When the StartUpOnOff attribute is set to the value 0xff, the light source(s) of the light device are activated (turned on) if they were on before the power was last turned off and not activated if they were off before the power was last turned off.

The advantage of this solution is that a user will not need to turn the light off or on again after a power outage occurs, which is especially beneficial in regions with an instable power grid, e.g. India.

However, a drawback of this solution is that when a user first switches the light device into standby mode, e.g. using his mobile device or a dedicated remote control, when he no longer needs the light provided by the light device and then uses a legacy wall switch to cut the power to the light device before he leaves, when he returns and uses the legacy wall switch again, the light does not turn on. Instead of using his mobile device or dedicated remote control to activate the light source, the user may end up flicking the wall switch several times until he realizes his mistake or concludes that the light device is broken.

U.S. Pat. No. 5,212,478 A discloses a dynamic system by which an electrically-powered load recovers from a power outage after power is restored.

SUMMARY OF THE INVENTION

It is a first object of the invention to provide a light device, which is able to react better to power outages.

It is a second object of the invention to provide a method of activating at least one light source, which can be used to react better to power outages.

In a first aspect of the invention, the light device comprises at least one light source, a memory and at least one controller configured to, upon being powered on, read a value from said memory, said value depending on how long said light device was continuously powered on before said light device was last powered off, determine from said value whether said light device was continuously powered on for more than a predetermined period before said light device was last powered off, and activate said at least one light source in dependence on said determination. Said at least one controller is preferably configured to activate said at least one light source upon determining that said light device was continuously powered on for less than said predetermined period before said light device was last powered off.

The inventor has recognized that it is beneficial to detect whether a user is flicking a light switch, i.e. cutting power and immediately restoring power, and activating a light source connected to the light switch when this behavior is detected. This is more likely to be the behavior that the user is expecting and informs the user that the light device is not broken. The inventor has further recognized that whether a user is flicking a light switch can be detected by determining whether said light device was continuously powered on for more than a predetermined period before said light device was last powered off, as the light device will only be powered on briefly if a user is flicking a light switch a couple of times and when power is restored after a power outage, another power outage will normally not occur again immediately.

For example, a light device has at least two modes, goes to a predetermined setting upon being powered on in a first mode and normally goes to a last known state upon being powered on in a second mode. The light device implements the invention by not always going to the last known state in the second mode, but instead activating its light source if the previous power cycle was short, e.g. due to a wall switch double toggle.

Said at least one controller may be configured to transmit an information signal upon activating said at least one light source, said information signal indicating that a fast power cycle has occurred. This may be used as an additional warning to the user or to someone that may be near the user.

Said at least one controller may be configured to control said at least one light source to assume a state active just before said light device was last powered off upon determining that said light device was powered on for more than said predetermined perioded before said light device was last powered off. The risk that a user does not realize that he needs to use his mobile device or a dedicated remote control to activate the light and control the light device is typically somewhat larger if the light device is configured to assume a state active just before said light device was last powered off than if the light device is configured to always turn on in an OFF state.

Said at least one controller may be configured to assume said state if said light device has been configured with a preference to turn on in a last known state. Although certain types of light devices may always turn on in a last known state, the startup behavior of more advanced types of light device may be configurable, e.g. by the user.

Said at least one controller may be configured to read a configuration value of a Zigbee StartUpOnOff attribute and determine that said light device has been configured with a preference to turn on in a last known state if said configuration value equals 0xff. The use of Zigbee is advantageous, because many existing light devices use wireless communication that conforms to this standard.

Said at least one controller may be configured to receive a configuration input indicating that said light device is to be configured with a preference to turn on in a last known state and configure said light device with a preference to turn on in a last known state in dependence on said configuration input. This allows the user to configure the startup behavior of the light device.

Said value may depend on whether said light device was continuously powered on for more than a predetermined period before said light device was last powered off. This avoids the need to frequently write the elapsed time in the current power cycle to a non-volatile memory. For example, said at least one controller may be configured to set said value to a first value upon determining that a timer has elapsed and control said at least one light source to assume a state active just before said light device was last powered off if said value read from said memory equals said first value.

Said at least one controller may be configured to receive a configuration input indicating a time period and configure said predetermined period to equal said indicated time period. The specified time period may be chosen such that it is shorter than the duration of short power outages that may occur to prevent that short power outages cause the light(s) to turn on.

In a second aspect of the invention, the method comprises, upon said light device being powered on, reading a value from a memory of a light device, said value depending on how long said light device was continuously powered on before said light device was last powered off, determining from said value whether said light device was continuously powered on for more than a predetermined period before said light device was last powered off, and activating said at least one light source in dependence on said determination. Said method may be performed by software running on a programmable device. This software may be provided as a computer program product.

Said at least one light source may be activated upon determining that said light device was continuously powered on for less than said predetermined period before said light device was last powered off.

Said method may further comprise controlling said at least one light source to assume a state active just before said light device was last powered off upon determining that said light device was continuously powered on for more than said predetermined perioded before said light device was last powered off.

Said state may be assumed if said light device has been configured with a preference to turn on in a last known state.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising, upon said light device being powered on: reading a value from a memory of a light device, said value depending on how long said light device was continuously powered on before said light device was last powered off, determining from said value whether said light device was continuously powered on for more than a predetermined period before said light device was last powered off, and activating said at least one light source in dependence on said determination.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
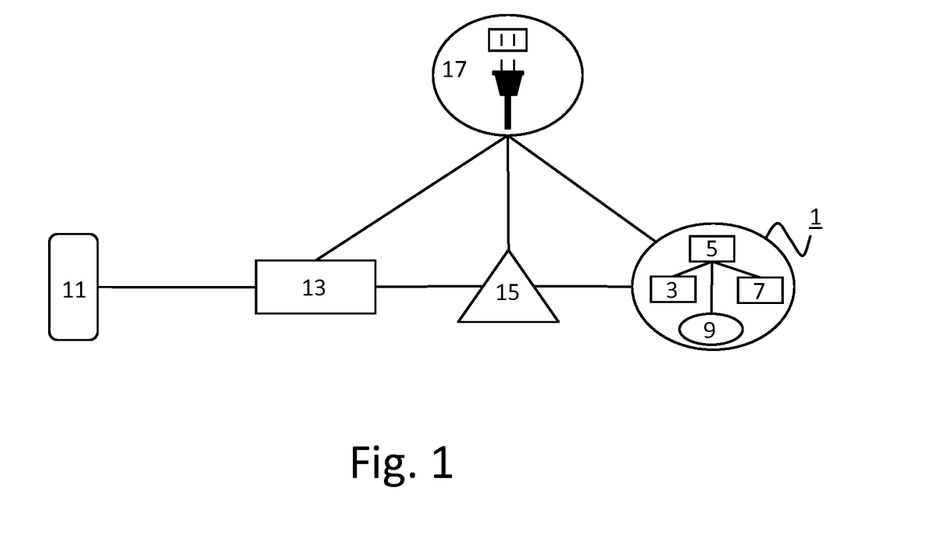
FIG. 1 is a block diagram of an embodiment of the light device of the invention.

FIG. 1 shows an embodiment of the light device of the invention: connected light device 1, e.g. a Philips Hue light. The light device 1 comprises a transceiver 3, a controller 5, a memory 7, and a light source 9. The controller 5 is configured to, upon being powered on, read a value from the memory 7. The value depends on how long the light device 1 was continuously powered on before the light device 1 was last powered off.

The controller 5 is further configured to, upon being powered on, determine from the value whether the light device 1 was continuously powered on for more than a predetermined period before the light device 1 was last powered off and activate the light source 9 in dependence on the determination. In particular, the controller 5 is configured to activate the light source 9 upon determining that the light device 1 was continuously powered on for less than the predetermined period before the light device 1 was last powered off.

The light device 1 communicates with a bridge 15, e.g. a Philips Hue bridge, wirelessly, e.g. via Zigbee. The bridge 15 is connected to a wireless LAN access point 13, e.g. via Ethernet. A mobile device 11 is also connected to the wireless LAN access point 13. The light device 1, the bridge 15 and the wireless LAN access point 13 receive power from the power grid via main power supply 17. In the embodiment of FIG. 1, a user of the mobile device 11 is able to control the light device 1 via an app running on the mobile device 11 and the controller 5 is configured to transmit an information signal to the mobile device 11 upon activating the light source 9. This information signal indicates to the user of the mobile device 11 that a fast power cycle has occurred, e.g. lets the user know that someone has toggled the wall switch who did not know that the app should have been used.

The transmission of the information signal is triggered by the activation of the light source 9 or by the same event that triggers the activation of the light source 9. The information signal may be transmitted before, after, or at the same time the light source 9 is activated. The transmission of the information signal is beneficial if the (fast) power cycle only applies to the light device 1, i.e. only light device 1 was turned off and on again, as the light device 1 typically boots up faster than the bridge 15 and the wireless LAN access point 13. However, a fast power cycle is most likely to involve only the light device 1.

The information signal may be transmitted using Zigbee, for example. A typical way of communicating the state of a Zigbee device involves the use of attributes. A light device can either report an attribute to the controller (e.g. bridge 15) or the controller can read an attribute. Another method is a Zigbee device announcement where the Zigbee device announces its presence to its neighbors on the Zigbee network.

In the embodiment of FIG. 1, the controller 5 is configured to control the light source 9 to assume a state active just before the light device 1 was last powered off upon determining that the light device 1 was powered on for more than the predetermined perioded before the light device 1 was last powered off. The controller 5 is configured to assume this state if the light device 1 has been configured with a preference to turn on in a last known state. For example, the controller 5 may be configured to read a configuration value of a Zigbee StartUpOnOff attribute and determine that the light device 1 has been configured with a preference to turn on in a last known state if the configuration value equals 0xff.

In the embodiment of FIG. 1, the controller 5 is configured to receive a configuration input indicating that the light device 1 is to be configured with a preference to turn on in a last known state and configure the light device 1 to turn on in a last known state in dependence on the configuration input. Alternatively, this configuration input may indicate that the light device 1 is to be configured with a preference to turn on in an ON or OFF state. This configuration input may be received from the mobile device 11, for example. The user may be able to use the same app that he uses to control the light device 11 to also configure settings/preferences in the light device 1, for example.

If the light device 1 supports Zigbee, it may be possible to configure the light device 1 by programming the StartUpOnOff attribute, for example. This attribute may be exposed to the bridge 15 via Zigbee. The bridge 15 may expose this as a configuration option for a light device on its API that can be used by the mobile device. The user is able to select which value will be programmed into the StartUpOnOff attribute: 0=OFF, 1=ON, 0xFF is previous state before power off.

The user may also be able to use this app to configure the predetermined period. This causes the mobile device 11 to transmit configuration input comprising a time period to the light device 1, whose controller 5 is configured to receive this configuration input and configure the predetermined period to equal the indicated time period. The specified time period may be chosen such that it is shorter than the duration of short power outages that may occur to prevent that short power outages case the lights to turn on. The user may even be able to turn off this feature entirely, e.g. by specifying a time period of zero. The bridge 15 may expose this as a configuration option (attribute) for a light device on its API that can be used by the mobile device, for example.

In the embodiment of the light device 1 shown in FIG. 1, the light device 1 comprises one controller 5. In an alternative embodiment, the light device 1 comprises multiple controllers. The controller 5 of the light device 1 may be a general-purpose processor, a general-purpose controller or an application-specific controller, for example. The light source 9 may comprise one or more LED diodes, for example. In the embodiment of FIG. 1, the light device 1 comprises a single light source. In an alternative embodiment, the light device 1 comprises multiple light sources. In such an alternative embodiment, one or more, possibly all, of the multiple light sources may be activated in dependence on the determination.

In the embodiment shown in FIG. 1, a receiver and a transmitter have been combined into a transceiver 3. In an alternative embodiment, one or more separate receiver components and one or more separate transmitter components are used. In an alternative embodiment, multiple transceivers are used instead of a single transceiver. The transceiver 3 may use one or more wireless communication technologies to communicate with bridge 15, e.g. ZigBee. The light device 1 may comprise other components typical for a light device such as a power connector. The memory 7 may comprise one or more memory units. The memory 7 may comprise solid-state memory, for example.

Figure 2:
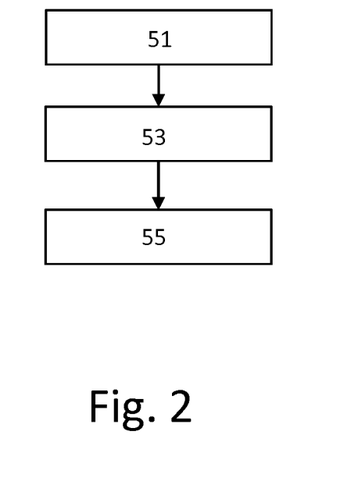
FIG. 2 is a flow diagram of a first embodiment of the method of the invention.

A first embodiment of the method of the invention is shown in FIG. 2. Steps 51 to 55 are performed upon the light device being powered on. Step 51 comprises reading a value from a memory of a light device. The value depends on how long the light device was continuously powered on before the light device was last powered off. Step 53 comprises determining from the value whether the light device was continuously powered on for more than a predetermined period before the light device was last powered off. Step 55 comprises activating the at least one light source in dependence on the determination. In the embodiment of FIG. 2, step 55 comprises activating the at least one light source upon determining that the light device was continuously powered on for less than the predetermined period before the light device was last powered off.

Figure 3:
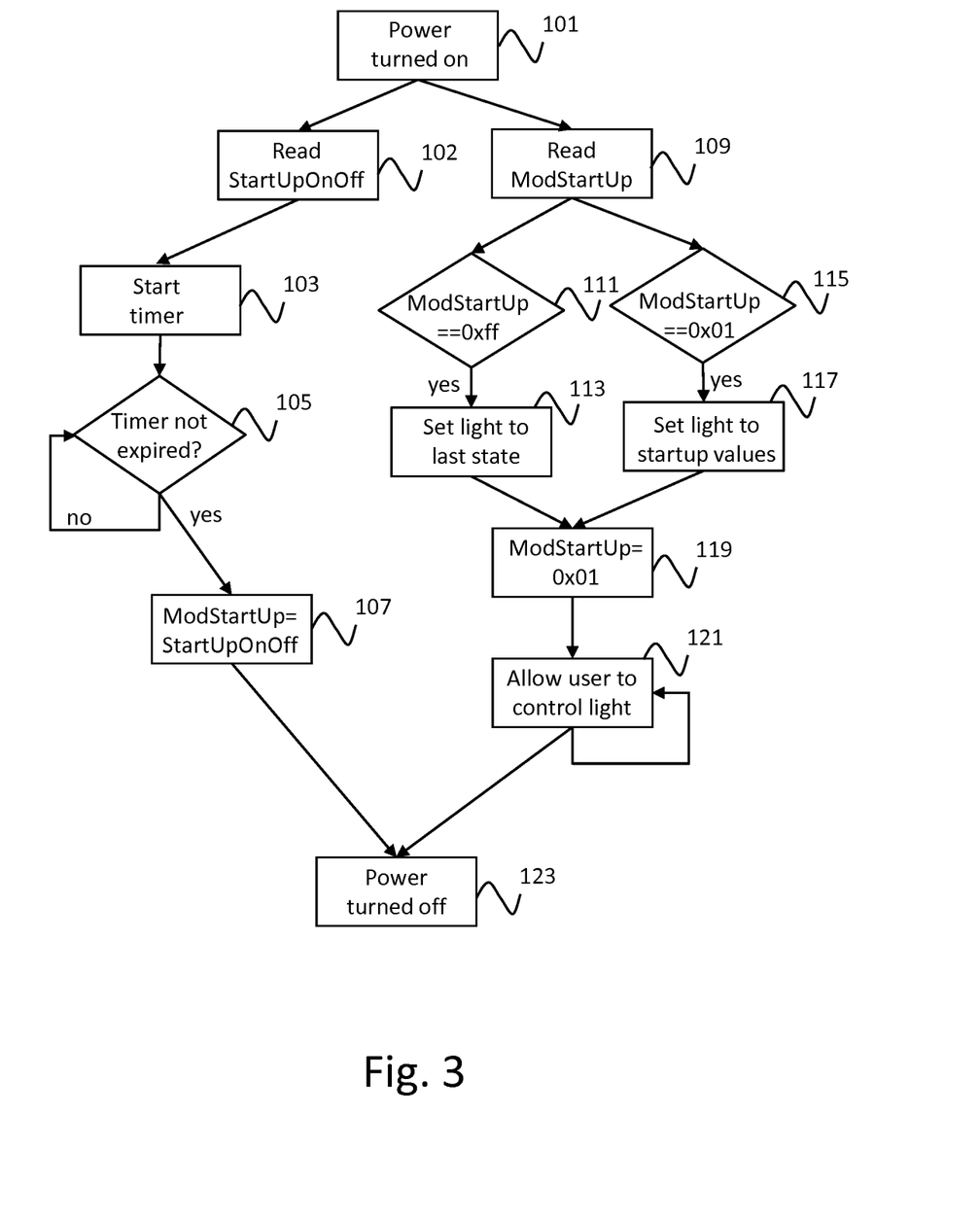
FIG. 3 is a flow diagram of a second embodiment of the method of the invention.

A second embodiment of the method of the invention is shown in FIG. 3. After the power of the light device is turned on in step 101, at least two parallel processes execute, of which two are shown. The first process begins by reading the value of the "StartUpOnOff" attribute in step 102 and starting a timer in step 103. In step 105, it is checked whether the timer has expired, i.e. step 105 comprises waiting until a predetermined time period has elapsed. If the predetermined time period has elapsed, step 107 is performed. Step 107 comprises setting the value of the "ModStartUp" attribute in the memory 7 of light device 1 of FIG. 1 to the value of the StartUpOnOff attribute. Thus, the value of the ModStartUp attribute depends on whether the light device was continuously powered on for more than a predetermined period before the light device was last powered off. This ends the first process.

The StartupOnOff attribute defines the default desired startup behavior of a lamp device when it is supplied with power and may be stored in non-volatile memory, for example. The possible values of the StartUpOnOff attribute are defined in the Zigbee standard, for example. The StartUpOnOff attribute may have a value 0x00 (off), 0x01 (on) or 0xff (assume last state), for example. The ModStartUp attribute represents the modified desired startup behavior of a lamp device when it is supplied with power (modified in order to implement the invention) and may be stored in non-volatile memory, for example. In an alternative embodiment, it is not checked whether a certain time period has elapsed, but the elapsed time is simply frequently stored in the memory 7. The ModStartUp attribute may be exposed via Zigbee as an indication to the bridge 15 and app on the mobile device 11 of the internal status of the light device 1.

The second process starts with reading the value of the ModStartUp attribute in step 109. At this moment, step 107 has not been performed yet in the current power cycle, so the value of the ModStartUp attribute was last set in the previous power cycle in step 107 or step 119. If the timer did not expire during the previous power cycle, because the user flicked the light switch a couple of times, then the ModStartUp attribute was last set to "0x01" in step 119. If this is determined to be the case in step 115, then the light source is activated with the default startup values (e.g. 2700K white light) or user-defined startup values in step 117. This ensures that the light source is activated when the user expects it to be.

If the timer did expire during the previous power cycle, then the ModStartUp attribute was last set to the value of the StartUpOnOff attribute in step 107. If the ModStartUp attribute is determined to be 0x01 in step 115, then the light source is activated with the default startup values (e.g. 2700K white light) in step 117. If the ModStartUp attribute is determined to be 0xff in step 111, then the light source is set to the last state (which it assumed in the previous power cycle) in step 113, which might be an ON state, but could also be an OFF state. The last state may be obtained from a non-volatile memory, for example.

Thus, the light source is controlled in step 113 to assume a state active just before the light device was last powered off if the value read from the memory in step 109 equals a first value set in step 107, but only if the first value set in step 107 equals "0xff". This is the case if the StartUpOnOff attribute had the value "0xff" (assume last state) when the value of the ModStartUp attribute was set to the value of the StartUpOnOff attribute in step 107.

Step 119 is performed after steps 113 and 117. At this moment, the timer has not expired yet and step 107 has not been performed yet. Step 119 comprises setting the value of the ModStartUp attribute to 0x01. Before the power of the light device is turned off in step 123, the user is allowed to control the light in step 121, e.g. change the chromaticity and/or brightness settings, set the light device to a standby mode and/or wake the light device up from a standby mode. The last state may thus be changed in this step 121. The last state may be stored in non-volatile memory, for example. If the power of the light device is not turned off in step 123 before the timer expires, step 107 will be performed in parallel to step 121.

Figure 4:
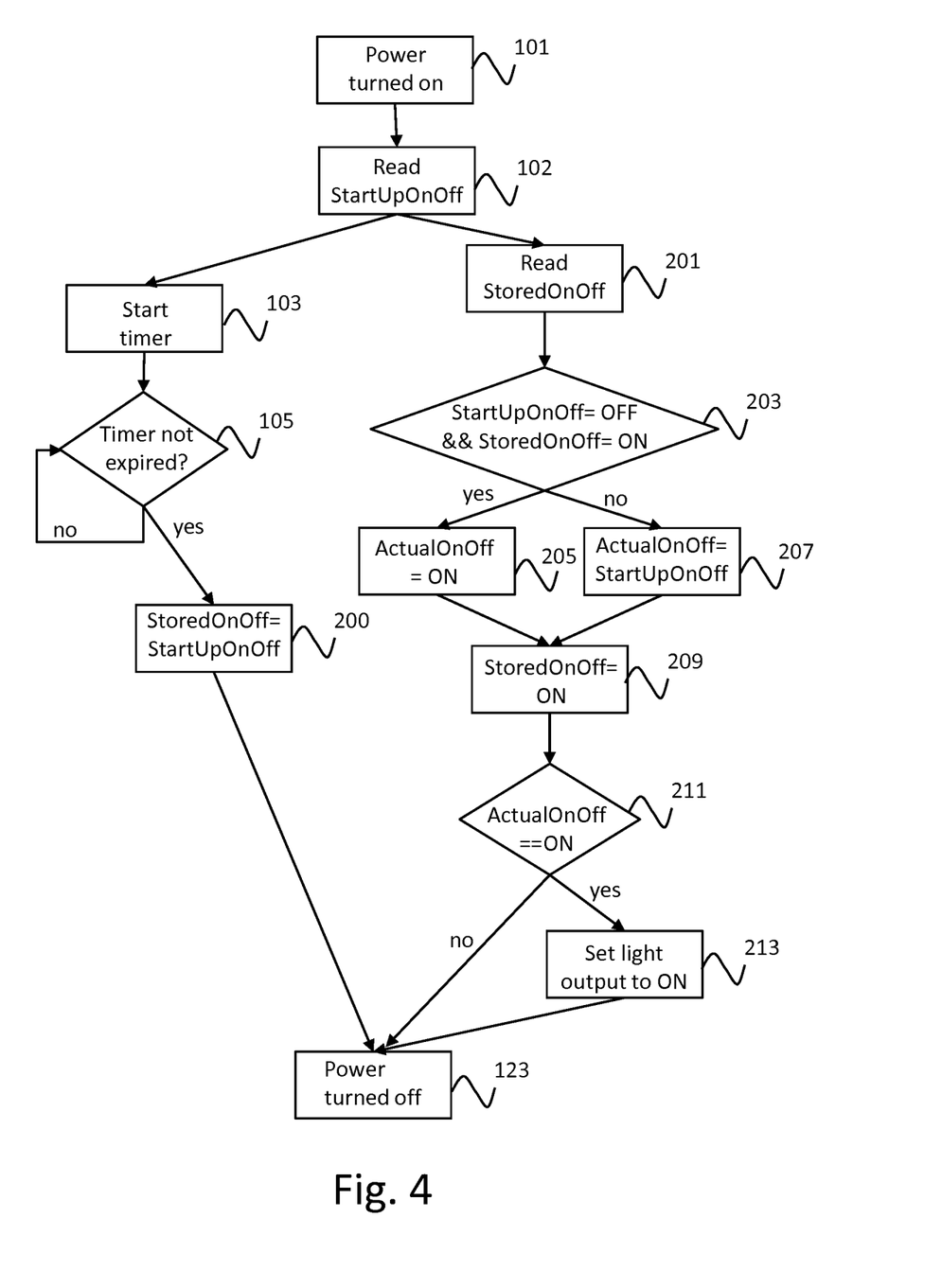
FIG. 4 is a flow diagram of a third embodiment of the method of the invention.

A third embodiment of the method of the invention is shown in FIG. 4. In this third embodiment, an additional "ActualOnOff" attribute is used, amongst others. The ActualOnOff attribute represents the real on/off state of the light source after startup and may be stored in RAM memory, for example. Furthermore, in this third embodiment, the StartUpOnOff attribute has a value ON or a value OFF. The StartUpOnOff attribute represents the default configured on/off state of the light source that should be activated after power is restored and may be stored in non-volatile memory, for example.

In the third embodiment of FIG. 4, the value of the StartUpOnOff attribute read in step 102 is used in the second process as well and in the first process, the value of a "StoredOnOff" attribute is set to the value of the StartUpOnOff attribute in step 200. A step 201 comprises reading the value of the StoredOnOff attribute. In step 203, it is checked whether the StartUpOnOff attribute has the value OFF and the StoredOnOff attribute has the value ON. If both are true, a step 205 is performed in which the value of the ActualOnOff attribute is set to ON. Thus, step 205 is performed in case the light device is configured to start in OFF (standby) mode, but the user quickly turned the light device off and on. Performance of step 205 causes the light device to start in ON mode instead of in OFF (standby) mode in this case.

If the StartUpOnOff attribute does not have the value OFF and/or the StoredOnOff attribute does not have the value ON, a step 207 is performed in which the value of the ActualOnOff attribute is set to the value of the StartUpOnOff attribute. A step 209 is performed after steps 205 and 207. In Step 209, the value of the attribute StoredOnOff is (temporarily) set to ON to detect a user briefly switching the power off. This step ensures that if the user switches off the power quickly, i.e. before step 200 is performed, the light device starts in ON mode the next time.

Next, it is checked in step 211 whether the value of the ActualOnOff attribute was set to ON. If the value of the ActualOnOff attribute was not set to ON, the second process terminates. Other processes than the second process, e.g. the first process and/or a third process, need not terminate at the same time. If the value of the ActualOnOff attribute was set to ON, a step 213 is performed. In step 213, light output is generated.

Figure 5:
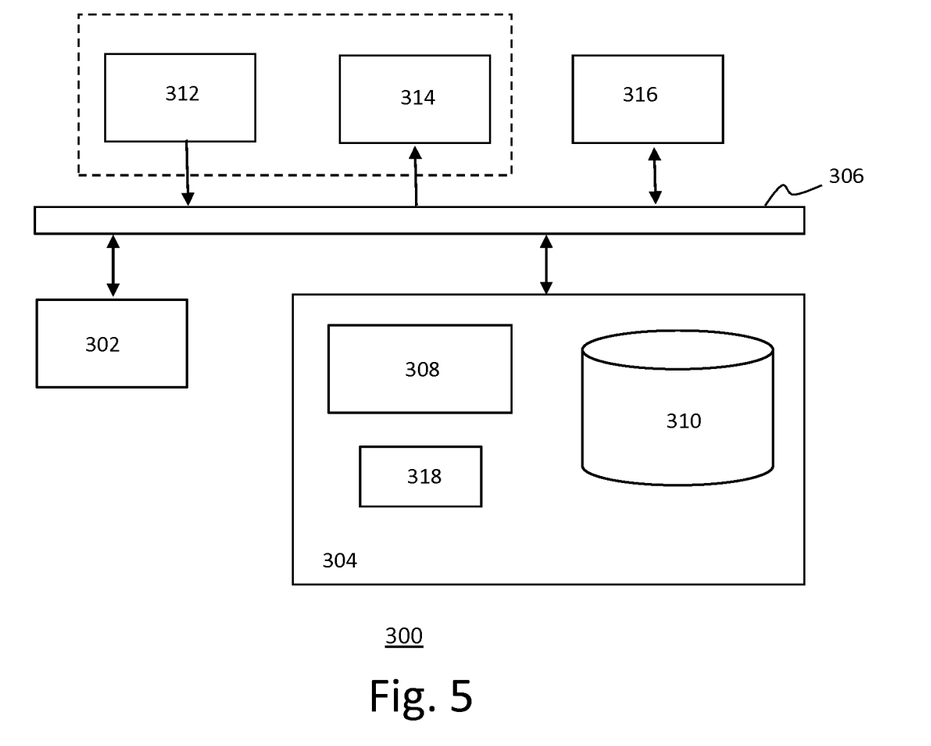
FIG. 5 is a block diagram of an exemplary data processing system for performing the method of the invention.

FIG. 5 depicts a block diagram illustrating an exemplary data processing system that may perform the method as described with reference to FIGS. 2 to 4.

As shown in FIG. 5, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 5 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 5, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 5) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A light device comprising at least one light source, a memory and at least one controller configured to, upon being powered on:

reada value from said memory, said value based on how long said light device was continuously powered on before said light device was last powered off, determine from said value whether said light device was continuously powered on for more than a predetermined period before said light device was last powered off, and activate said at least one light source upon determining that said light device was continuously powered on for less than said predetermined period before said light device was last powered off.

2. A light device as claimed in claim 1, wherein said at least one controller is configured to transmit an information signal upon activating said at least one light source, said information signal indicating that said light device was continuously powered on for less than said predetermined period before said light device was last powered off.

3. A light device as claimed in claim 1, wherein said at least one controller is configured to control said at least one light source to assume a state active just before said light device was last powered off upon determining that said light device was powered on for more than said predetermined perioded before said light device was last powered off.

4. A light device as claimed in claim 3, wherein said at least one controller is configured to assume said state if said light device has been configured with a preference to turn on in a last known state.

5. A light device as claimed in claim 4, wherein said at least one controller is configured to read a configuration value of a Zigbee StartUpOnOff attribute and determine that said light device has been configured with a preference to turn on in a last known state if said configuration value equals 0xff.

6. A light device as claimed in claim 4, wherein said at least one controller is configured to receive a configuration input indicating that said light device is to be configured with a preference to turn on in a last known state and configure said light device to turn on in a last known state in dependence on said configuration input.

7. A light device as claimed in claim 1, wherein said value depends on whether said light device was continuously powered on for more than a predetermined period before said light device was last powered off.

8. A light device as claimed in claim 7, wherein said at least one controller is configured to set said value to a first value upon determining that a timer has elapsed and control said at least one light source to assume a state active just before said light device was last powered off if said value read from said memory equals said first value.

9. A light device as claimed in claim 1, wherein said at least one controller is configured to receive a configuration input indicating a time period and configure said predetermined period to equal said indicated time period.

10. A method of activating at least one light source of a light device, comprising, upon said light device being powered on:

reading a value from a memory of a light device, said value based on how long said light device was continuously powered on before said light device was last powered off;

determining from said value whether said light device was continuously powered on for more than a predetermined period before said light device was last powered off; and activating said at least one light source upon determining that said light device was continuously powered on for less than said predetermined period before said light device was last powered off.

11. A method as claimed in claim 10, further comprising controlling said at least one light source to assume a state active just before said light device was last powered off upon determining that said light device was continuously powered on for more than said predetermined perioded before said light device was last powered off.

12. A method as claimed in claim 11, wherein said state is assumed if said light device has been configured with a preference to turn on in a last known state.

13. A computer program or suite of computer programs comprising at least one software code portion or a computer program product storing at least one software code portion, the software code portion, when run on a computer system, being configured for carrying out the method of claim 10.

* * * * *